Dec. 2, 1958 E. L. WOOD 2,862,769
TIRE TRIM – WHEEL TRIM CONSTRUCTION
Filed July 5, 1956 2 Sheets-Sheet 2
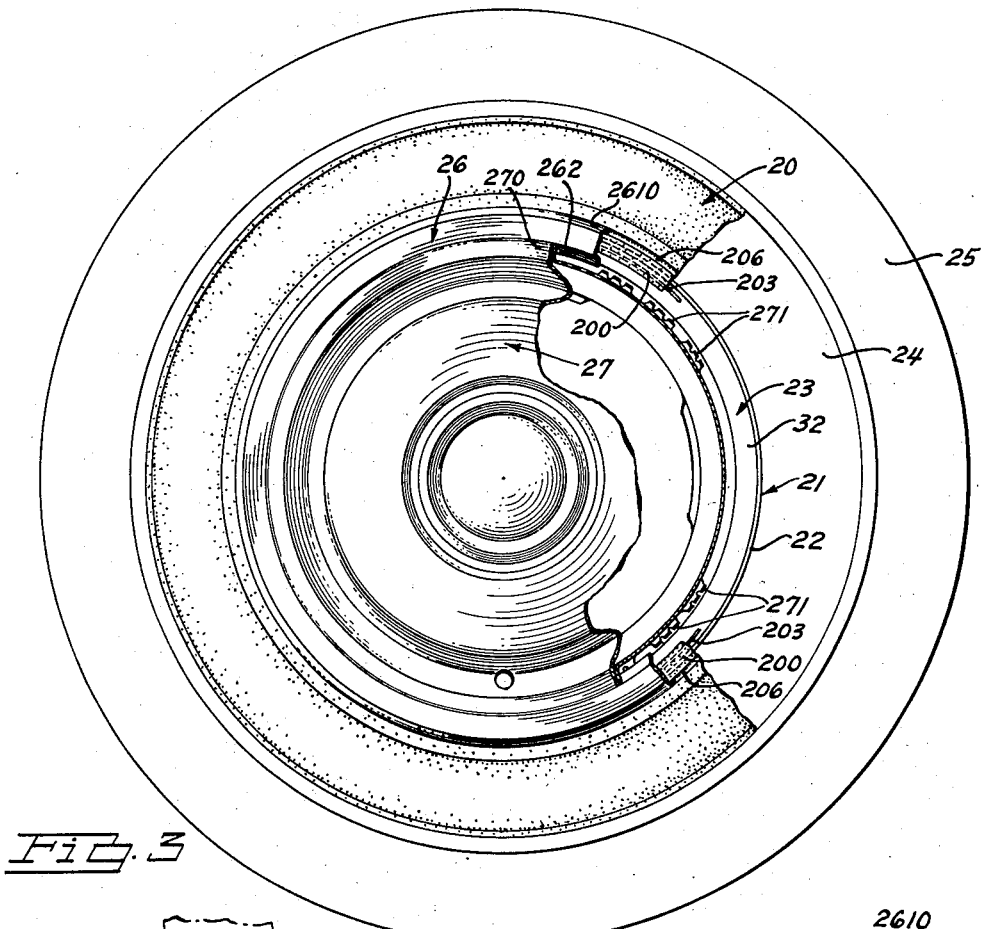
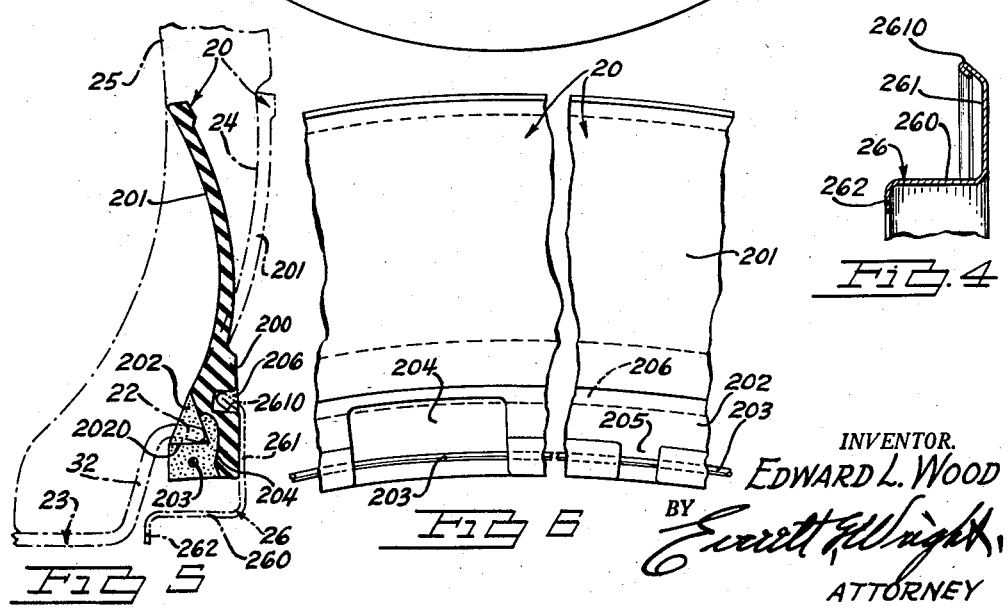
INVENTOR.
EDWARD L. WOOD
BY
ATTORNEY

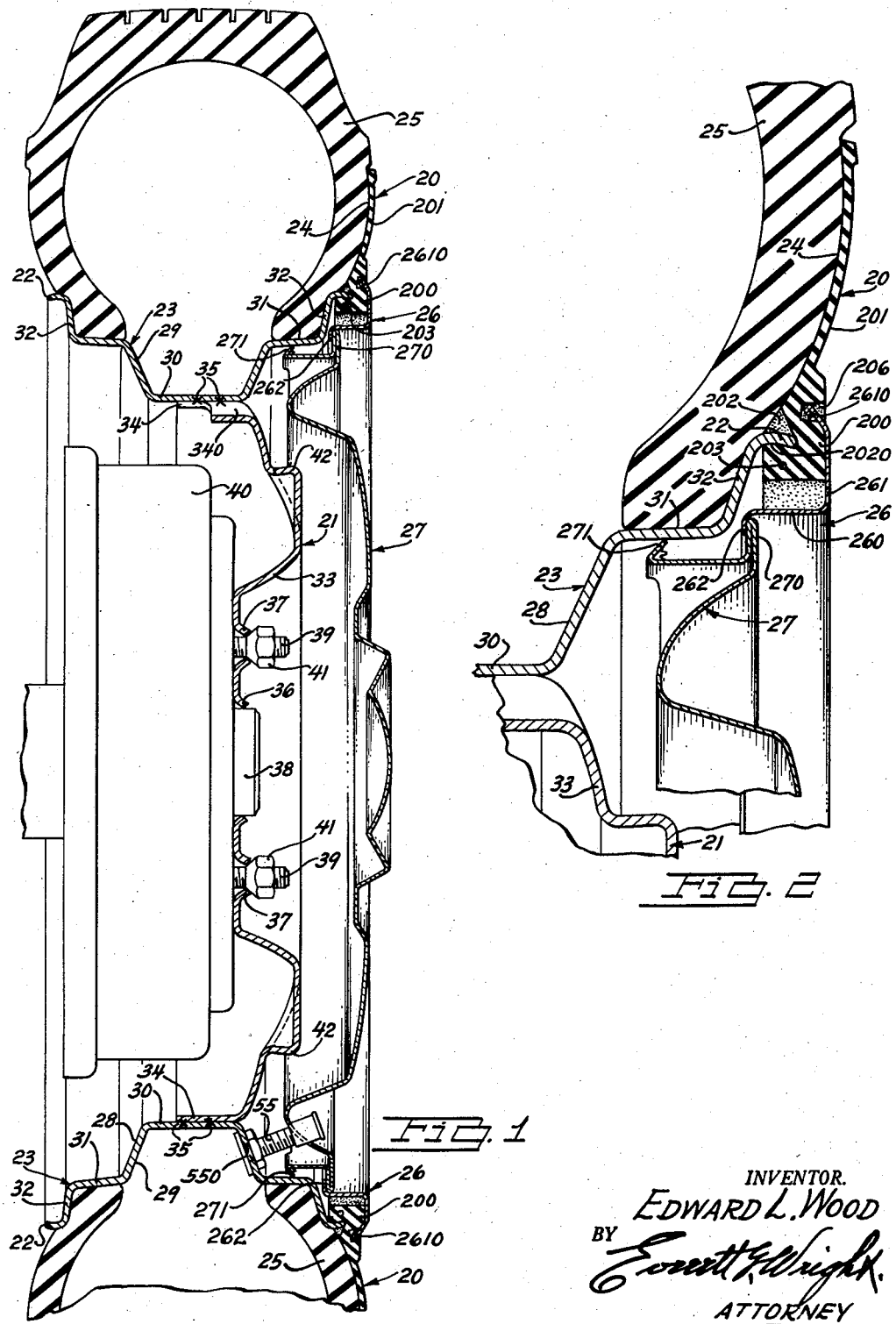

United States Patent Office

2,862,769
Patented Dec. 2, 1958

2,862,769

TIRE TRIM-WHEEL TRIM CONSTRUCTION

Edward L. Wood, Detroit, Mich., assignor, by direct and mesne assignments, to Gar Wood Industries, Inc., a corporation of Michigan Application July 5, 1956, Serial No. 596,059

9 Claims. (Cl. 301—37)

This invention relates to tire trim employed to ornamentally trim the side walls of tires of automotive vehicles and the like, and means for securing the same onto the wheel.

In the prior art, trim rings and wheel covers for automobile wheels have been and still are extensively employed to ornament vehicle wheels. Such wheel trim generally does not extend over the lip of the rim of the wheel, particularly when the trim rings or wheel covers are secured onto the vehicle wheel by resilient toothed gripping means of the type disclosed in Patent No. 1,948,273 issued February 20, 1934, and in Patent No. 1,958,484 issued May 15, 1934, the latter patent having been reissued as Re. 19,467 on February 12, 1935.

Wheel trim and wheel covers of the type disclosed in the referenced patents ofttimes pop off wheels equipped therewith when the wheel trim or wheel covers are positioned on the wheel with the teeth thereof in biting engagement with the wheel flange, particularly when the outer periphery of the wheel trim or wheel covers are firmly engaged over the lip of the wheel rim. Therefore, in many instances, particularly when wheel covers are secured onto the wheel by such toothed means, the lip of the rim is not covered thereby. This leaves the lip of the wheel rim exposed, and when conventional white side wall tires are used as tire trim, the combined effect of the wheel trim and the tire trim is not all that is desired.

The instant improvements over the prior art constructions provides a novel combination of tire trim for the tires of vehicle wheels and wheel trim for vehicle wheels and an intermediate interlocked securing ring, which combination of elements permits the use as an element thereof of either ornamental wheel covers or ornamental wheel rings of conventional construction which do not overlie the lip of the wheel rim and which are secured to the wheel rim by spring toothed gripping means. The said combination of elements fully cover the inner annular portion of the wall of the vehicle tire, the lip of the rim, and so much of the vehicle wheel as desired, all with aesthetic unity and considerable less likelihood of the wheel trim popping off the vehicle wheel under shock loads.

With the foregoing in view, the primary object of the invention is to provide the combination of tire trim including an outer annular wall portion and inner annular bead portion overlying the tire and lip of the wheel rim respectively secured over the tire wall and lip of the wheel rim by an overlying securing ring, which securing ring is in turn engaged by the outer periphery of wheel trim such as a wheel cover or wheel trim ring fixable in removable relationship to the wheel by such means as resilient toothed means of the prior art, the relationship of the securing ring to the bead of the tire trim and the relationship of the wheel trim to the securing ring, together with the combined resiliency thereof, being such that the entire assembly may be satisfactorily removably secured to the vehicle wheel by the said toothed wheel trim.

Other objects of the invention will become apparent by reference to the following detailed description taken in connection with the accompanying drawings, in which:

Fig. 1 is a vertical sectional view through a vehicle wheel and tire having thereon a combination of tire and wheel trim illustrating the invention.

Fig. 2 is an enlarged fragmentary sectional view showing in detail the combination of elements comprising the embodiment of the invention disclosed in Fig. 1.

Fig. 3 is a side elevational view of the construction shown in Fig. 1 with parts broken away to more clearly illustrate the invention.

Fig. 4 is a cross sectional view through one form of an intermediate securing ring preferably employed.

Fig. 5 is an enlarged cross sectional full line view of tire trim embodying the invention in its molded form before placement over the lip of the wheel rim and against the wall of the tire mounted thereon, in which view is a dot and dash showing of the flexed position taken by the tire trim upon placement onto a wheel rim, the intermediate securing ring being shown disposed over the inner annular bead of the tire trim ready to be engaged at its inner peripheral lip and held in place by wheel trim such as a wheel cover or a wheel trim ring.

Referring now to the drawings wherein like numerals refer to like and corresponding parts throughout the several views, the particular combination of elements disclosed for the purpose of illustrating the invention consists of a tire trim ring 20 positioned onto the lip 22 of the rim 23 of a vehicle wheel 21, an intermediate securing ring 26 overlying the inner peripheral bead portion 200 of the tire trim ring 20 and the lip 22 of the wheel rim 23, and a wheel trim element such as a wheel cover or wheel ring 27 overlying the inner annular flange 262 of the intermediate securing ring 26 and engaging the wheel rim 23 by such means as conventional spring securing teeth 271.

The tire trim ring 20 is preferably molded of rubber or other resilient material of the desired color to a cross sectional contour preferably as shown in Fig. 5 with an inner annular bead portion 200 and an outer arcuately formed annular wall portion 201. The inner annular bead portion 200 of the tire trim ring 20 is provided with an annular axially extending angular goove 202 in the axially inner face thereof which registers with the lip 22 of the wheel rim 23 when positioned thereover as clearly shown in Figs. 1, 2 and 5, the radially outward facing annular wall 2020 of the annular bead portion 200 contacting the bottom of the lip 22 of the rim 23. The outer arcuately formed annular wall portion 201 of the tire trim ring 20 is preferably molded as shown by the full lines in Fig. 5 so that, when the said tire trim ring 20 is properly positioned onto the wheel rim 23 with the annular groove 202 of the bead portion 200 thereof disposed in registry with the lip 22 of the said wheel rim 23, the said arcuately formed annular wall portion 201 will flex into a firm juxtaposition with the wall 24 of the tire 25 mounted on the said wheel rim 23. The inner annular bead portion 200 of the tire ring 20 is preferably reinforced by an annularly formed continuous wire loop 203. Although not necessary to the instant invention, the axially inwardly disposed face of the annular bead portion 200 of the tire trim ring 20 is preferably provided with a plurality of pockets 204 and 205 uniformly spaced therearound. The axially outer face of the bead portion 200 of the tire trim 20 is preferably provided with an annular groove 206 therein disposed radially outwardly in respect to the groove 202 in the axially inner face thereof.

The intermediate securing ring 26 is preferably formed of a thin bright finish stainless steel, or, it may be formed of a light gauge cold rolled steel and chrome plated or otherwise finished to match, conform to or contrast with the color and finish of the tire trim ring 20 and/or the wheel trim element 27. The intermediate securing ring 26 has an annular axially disposed body portion 260, a relatively wide outer annular flange 261 and a relatively narrow inner annular flange 262. The extreme outer periphery of the outer annular flange 261 is provided with an axially inwardly formed lip 2610 which registers with the annular groove 206 in the axially outer face of the bead portion 200 of the tire trim 20 when both are positioned onto a vehicle wheel as best illustrated in Fig. 2.

The wheel trim element 27 which may be either a wheel cover as shown or a wheel trim ring is formed to provide an annular outer flange 270 which overlies and engages the narrow inner annular flange 262 of the intermediate securing ring 26 when the said wheel trim element 27 is removably secured to the bottom of the tire bead seat 31 of the drop center portion 28 of the wheel rim 23 by such conventional means as the resilient securing teeth 271. Obviously, other means may be employed to removably secure the wheel trim element 27 to the wheel rim 23. Also, by employing different colors of finish in connection with the tire trim ring 20, the intermediate securing ring 26 and the wheel trim element 27, a number and variety of aesthetically different wheel and tire trim combinations may be obtained. As an example, but not limiting, a yellow automotive vehicle may employ matching yellow tire trim ring 20, and if the car has red upholstery, the intermediate securing ring 26 may be dipped or coated in red to match the upholstery, and the wheel cover or wheel ring or other wheel trim element 27 may be chrome finished. Or, if preferred, the tire trim ring 20 may be red to match the upholstery, and the intermediate securing ring 26 coated in yellow to match the car, while the wheel trim 27 remained a chrome finish. Also, carrying the illustrative example further, the tire trim ring 20 may be red or yellow, and the intermediate securing ring 26 and the wheel trim 27 may be in chrome finish.

A typical vehicle wheel 21 shown in Figs. 1, 2 and 3 with which the invention is primarily usable is shown with a tubeless tire 25 mounted thereon. The said vehicle wheel 21 has a drop center rim 23 composed of a central channel or drop center 28 having side walls 29 and a base 30. A tire bead seat 31 extends laterally outwardly from each of the channel side walls 29 and has a flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and studs 39 extending from the brake drum 40 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap, if used, would be sprung for securement onto the vehicle wheel 21. The tire 25 mounted on the vehicle wheel 21 is shown as a modern tubeless tire. A valve stem 55 extends through a valve stem aperture 550 provided in the drop center rim channel 28.

The instant invention provides an extremely practical and novel combination of elements which may be employed in many ways and with many color and contrast schemes to ornament a vehicle tire and wheel. In addition, due to the resiliency of the inner annular bead portion 200 of the tire trim ring 20 and the engagement of the outer flange 2610 of the intermediate securing ring 26 into the outer annular groove 206 in the bead portion 200 of the said tire trim ring 20, the said bead portion 200 of the tire trim ring 20 gages itself by means of the inner annular groove 202 therein firmly and concentrically onto the lip 22 of the wheel ring 23, the radially outwardly facing wall 2020 of the said bead portion 200 at the groove 202 therein resting against the radially inner portion of the lip 22 of the rim 23.

The novel combination of the inner bead portion 200 of the tire trim ring 20 with the overlying intermediate securing ring 26 makes possible the use therewith of conventional wheel trim 27 such as so-called full wheel covers and trim rings which do not extend over the lip of the wheel rim and which are secured to the wheel rim 23 by toothed means 271 or the like, all with added insurance that the teeth 271 of the wheel trim 27, if used as a wheel trim securing means, will adequately removably secure the entire combination of elements 20, 26 and 27 into a unitary whole onto the vehicle wheel 21 and over the wall 24 of the tire 25.

Although but a single embodiment of the invention has been disclosed and described herein, it is obvious that many changes may be made in the size, shape, arrangement and detail of the several elements of the invention, all without departing from the spirit and scope of the invention as defined by the appended claims.

I claim:

1. In combination with a vehicle wheel having a tire mounted thereon, annular tire trim overlying the wall of said tire including a bead telescoped over the lip of said wheel rim, a tire trim securing ring engaging said tire trim and overlying said bead thereof, and wheel trim axially and concentrically fixed onto said vehicle wheel concentrically engaging said tire trim securing ring and axially fixing said tire trim securing ring and said tire trim onto said vehicle wheel.

2. In combination with a vehicle wheel having a tire mounted thereon and wheel trim for said wheel including means carried by said wheel trim securing the same to said wheel, annular tire trim overlying the wall of said tire including a bead overlying the lip of the rim of said wheel, and a tire trim securing ring engaging said tire trim axially and concentrically fixed onto said vehicle wheel by said wheel trim whereby to secure said tire trim concentrically on said wheel rim and against said tire wall.

3. In combination with a vehicle wheel having a tire mounted thereon and wheel trim including means carried thereby securing the said wheel trim axially and concentrically onto said wheel, annular tire trim overlying the wall of said tire including a bead having an inwardly facing annular groove therein, said bead being telescoped onto the lip of said wheel rim, and a tire trim securing ring overlying and engaging said tire trim bead including a narrow inner annular flange engaged by said wheel trim whereby to axially and concentrically fix said tire trim onto said vehicle wheel and against the wall of the tire thereon.

4. In combination with a vehicle wheel having a tire mounted thereon and wheel trim for said wheel including means securing the same axially onto said wheel, annular tire trim overlying the wall of said tire including a bead overlying the lip of said wheel rim, the said bead having inner and outer annular grooves therein, the said bead being telescoped at said inner annular groove therein over the lip of the wheel rim, and a tire trim securing ring formed at its outer periphery to engage said tire trim at said outer annular groove therein, said tire trim ring including a narrow inner annular flange axially and concentrically engaged by said wheel trim whereby to axially and concentrically fix said tire trim onto said wheel rim and against the wall of said tire.

5. In combination with a vehicle wheel having a tire mounted thereon and wheel trim for said wheel including means securing the same onto said wheel, arcuately formed annular tire trim overlying the wall of said tire including a bead overlying the lip of the rim of said wheel, said bead having inner and outer annular grooves therein, the inner annular groove of said tire trim bead registering with the lip of the wheel rim maintaining said tire trim concentric with said wheel rim, and a tire trim securing ring including axially offset oppositely radially extending outer and inner flanges, the outer of said offset flanges of the said securing ring being formed to telescope into the outer annular groove of said tire trim bead, the said wheel trim engaging the inner of said offset flanges of the said securing ring when secured onto said wheel axially and concentrically fixing said tire trim securing ring and said tire trim onto said vehicle wheel.

6. In tire and wheel trim for vehicle wheels having a tire thereon, in combination, an annular tire trim including a bead portion having an axially inwardly disposed annular groove therein telescoped over the lip of the wheel rim, the said tire trim including an outer annular portion formed of an arcuate cross section having a curvature greater than the curvature of the wall of said tire flexing firmly thereagainst responsive to mounting the tire trim on the vehicle wheel with the bead portion thereof telescoped over the lip of said wheel rim, an annular securing ring having outer and inner flanges, the said outer flange of said securing ring engaging the said tire trim, and a wheel trim member having an outer annular flange overlying the inner annular flange of said securing ring, and means carried by said wheel trim member anchoring the same to said wheel rim when urged axially onto said wheel.

7. In tire and wheel trim for vehicle wheels having a tire thereon, in combination, an annular tire trim including annular wall and bead portions, said bead portion having an axially inwardly disposed annular groove therein telescoped over the lip of the wheel rim to maintain said tire trim concentrically thereon, the said wall portion being formed to an arcuate cross section having a curvature greater than the curvature of the wall of said tire flexible thereagainst responsive to mounting the tire trim on the vehicle wheel with the bead portion thereof disposed firmly onto the lip of said wheel rim, said tire trim having an axially outwardly disposed annular groove around the outer periphery thereof located radially outwardly in respect to said inner annular groove in the bead portion, an annular securing ring having outer and inner flanges, the said outer flange of said securing ring being formed to engage the said tire trim on the outer peripheral groove therein, and a wheel trim member having an outer annular flange overlying the inner annular flange of said securing ring, and means carried by said wheel trim member for fixing the same to said wheel rim when urged axially onto said wheel.

8. In tire and wheel trim for vehicle wheels having a tire thereon, in combination, an annular tire trim including a bead portion having an axially inwardly disposed annular groove therein telescoped over the lip of the wheel rim maintaining said tire trim concentrically thereon, the said tire trim including an outer annular portion formed of an arcuate cross section having a curvature greater than the curvature of the wall of said tire flexing firmly thereagainst when said tire trim is positioned on the vehicle wheel with the bead portion thereof telescoped firmly onto the lip of said wheel rim, said tire trim having an axially outwardly disposed annular groove around the outer periphery thereof located radially outwardly in respect to said inner annular groove in the bead portion, an annular securing ring including axially offset oppositely radially extending outer and inner flanges, the said outer flange of said securing ring being formed to telescope into the outer peripheral groove in said tire trim, and a wheel trim member including an outer annular flange overlying said inner annular flange of said securing ring, and means anchoring the said wheel trim member to said wheel rim when urged axially onto said wheel.

9. In combination, a vehicle wheel, wheel trim, and an annular tire trim, the said tire trim including annular wall and bead portions, said bead portion having an axially inwardly disposed annular groove therein telescoped over the lip of the wheel rim to maintain said tire trim concentrically thereon, said annular portion being formed of an arcuate cross section having a curvature greater than the curvature of the wall of said tire for flexing firmly thereagainst when said tire trim is positioned on the lip of said wheel rim, an annular securing ring having outer and inner annular flanges, the said outer annular flange of said securing ring engaging the tire trim over the bead portion thereof, said wheel trim including an outer annular flange overlying the inner annular flange of said securing ring, and means axially anchoring said wheel trim to said wheel rim when urged axially onto said wheel causing said securing ring to axially hold said tire trim bead concentrically on the lip of said wheel rim and said tire trim wall against said tire.

References Cited in the file of this patent

UNITED STATES PATENTS 2,725,257     Maurer et al.     Nov. 29, 1955

FOREIGN PATENTS 1,061,278     France     Nov. 25, 1953